United States Patent [19]

Stuart

[11] Patent Number: 4,765,088
[45] Date of Patent: Aug. 23, 1988

[54] CRAB TRAP

[76] Inventor: Robert L. Stuart, 300 Husson St., Staten Island, N.Y. 10306

[21] Appl. No.: 58,506

[22] Filed: Jun. 1, 1987

[51] Int. Cl.[4] ............................................. A01K 69/10
[52] U.S. Cl. ...................................... 43/102; 43/105; 43/100
[58] Field of Search .......................... 43/100, 102, 105

[56] References Cited

U.S. PATENT DOCUMENTS

| 1,054,880 | 3/1913 | Svoboda | 43/105 |
| 1,188,185 | 6/1916 | Krulish | 43/105 |
| 2,821,047 | 1/1958 | Ruiz | 43/102 |
| 3,867,782 | 2/1975 | Ortiz | 43/105 |
| 4,044,493 | 8/1977 | Fox | 43/105 |
| 4,050,182 | 9/1977 | Basile | 43/105 |
| 4,434,575 | 3/1984 | Pearson | 43/100 |
| 4,479,325 | 10/1984 | Jakimas | 43/105 |
| 4,554,760 | 11/1985 | Ponzo | 43/100 |

*Primary Examiner*—Kurt Rowan
*Attorney, Agent, or Firm*—Richard L. Miller

[57] ABSTRACT

This crab trap is so designed, as to automatically pivot open its gates after being bottomed in a water body when slack is taken on its attached rope and gate cords. Primarily, it consists of a base with four hinged gates, and a coil spring received on each side of the base, provides for automatically and fully opening the gates when slack is taken on the cords and the attached rope.

5 Claims, 1 Drawing Sheet

U.S. Patent  Aug. 23, 1988  4,765,088
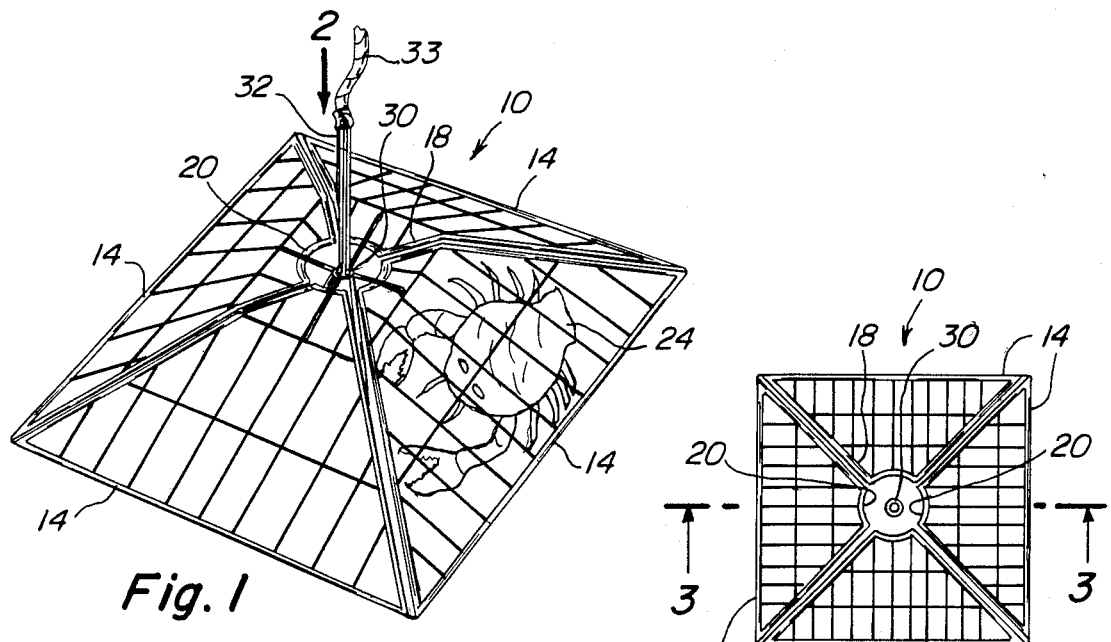
Fig. 1
Fig. 2
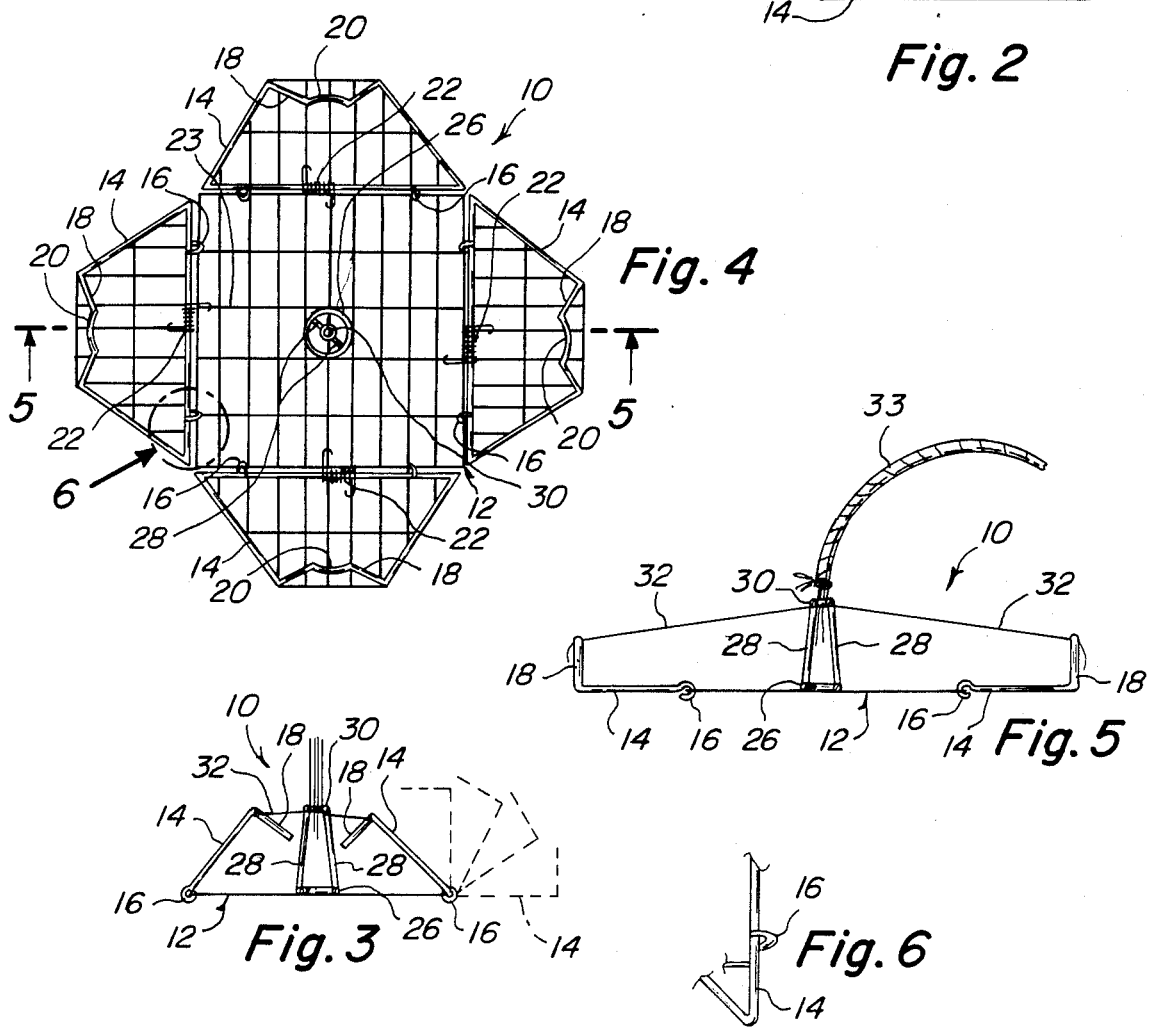
Fig. 4
Fig. 5
Fig. 3
Fig. 6

CRAB TRAP

BACKGROUND OF THE INVENTION

The instant invention relates generally to traps, and more particularly, to a crab trap.

Numerous traps have been provided in the prior art that are adapted to be employed for catching crabs. For example, U.S. Pat. Nos. 3,867,782 of Ortiz, 4,044,493 of Fox and 4,554,760 of Ponzo all are illustrative of such prior art. While these units may be suitable for the particular purpose to which they address, they would not be as suitable for the purpose of the present invention as hereafter described.

SUMMARY OF THE INVENTION

A primary object of the present invention is to provide a crab trap that will overcome the shortcomings of the prior art devices.

Another object is to provide a crab trap, which will be designed, as to keep sideward play of its gates at a minimum for enabling a crab to be grasped securely at the junction of two gates.

An additional object is to provide a crab trap that will employed springs for pushing each side gate outward when bottomed.

A further object is to provide a crab trap that is simple and easy to use.

A still further object is to provide a crab trap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view of the invention in a closed position illustrated with a crab trapped therein;

FIG. 2 is a diagrammatic top view as indicated by arrow 2 in FIG. 1;

FIG. 3 is a diagrammatic cross sectional view taken along line 3—3 in FIG. 2,

FIG. 4 is a top view similar to FIG. 2 showing the invention in an open position;

FIG. 5 is diagrammatic cross sectional view taken along line 5—5 in FIG. 4; and

FIG. 6 is an enlarged detail view of one of a portion of a typical gate eyelet hinge as indicated in the dotted circle 6 of FIG. 4.

DETAILED DESCRIPTION OF THE PREFERRED EMBODIMENTS

Turning now descriptively to the drawings, in which like reference characters denote like elements throughout the several views, FIG. 1 through 5, illustrates a trap 10 consisting of a base 12 having two pairs of oppositely opposed side gates 14 with eyelets 16 that hinge to the sides of base 12. The top portions 18 of gates 14 are formed at right angles to gates 14 and give trap 10 a truncated pyramid appearance when closed, and each top portion 18 includes an arcuate portion 20 that forms a circle at the top of a trap 10 when gates 14 are closed. A coil spring 22 is installed on the bottom portions of each gate 14 and one end engages with a wire of the gates 14, while the other end engages with a wire of the base 12. The springs 22 are so designed, as to forcefully pivot open the gates 14 when the trap 10 is on the bottom of a water body for trapping a crab 24 within trap 10. The gates 14 when closed, form an overhead canopy and keep side ward play of the gates 14 to a minimum, enabling a crab 24 to be firmly grasped at the junction of two gates 14, which is usually by the crab's claws, and it is to be noted, that the springs 22 are set in opposition to the mesh wires 23 of the base 12, for pivotal outward movement.

A large diameter ring 26 is fixedly secured to the top center of base 12 and a pair of posts 28 are fixedly secured to the top of ring 26. A small ring 30 is fixedly secured to the tops of posts 28 for forming a guide and bearing for cords 32 that are tied to the tops of gates 14 at one end, and are similarly tied at the opposite ends, to a rope 33 that is employed for lifting trap 10 from the water, and it shall further be noted, that the posts 28 are disposed on a diagonal with respect to side gates 14, for enabling a free path for the cords 32 to the side gates 14.

It shall further be reconized that the cords 32 are threaded through the small ring 30 which is held approximately three and one quarter inches above the trap base 12 and a knot is tied in the cords 32 close up to the top of the cord ring 30 that is a cord guide, so as to keep the cords 32 as high as possible above the base 12, while still enabling the gates 14 to fully open.

In operative use, trap 10 is lowered in the water by the rope 33, and when on the bottom of a water way, the springs 22 will force the gates 14 fully open. When the rope 33 is pulled and lifts trap 10, the gates 14 are pulled shut against the tension of springs 22, by the tension of the cords 32 through rope 33 entrapping what ever creatures are inside such as crab 24.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A crab trap, comprising, a base, two pairs of gates hinged to said base, for entrapment of a crab, coil spring secured to said gates and said base, providing full automatic opening of said gates when said trap is on bottom of a waterway, a large ring secured to said base, and a pair of posts secured to said large ring, a small ring fastened to said large ring for serving as guide means, cords fastened to said gates for closing said gates when said trap is lifted, and passing through said guide means, and wherein each said gate is substantially triangular in configuration with the upper ends of said gates coming together to form an apex portion, a flange portion formed at the top of each gate portion at substantially right angles thereto, the flange portions including an arcuate cut out, such that said flange portions extend inwardly of said trap to retain the crab, and said arcuate cut outs form a circular opening when said gates are closed for passage of said cords that are tied to a rope for lowering said trap in water, and closing said gates against spring tension of said coil spring when lifting said trap.

2. A crab trap as set forth in claim 1, wherein said base is square in configuration and said gates include eyelets at a base portion which receives a base rod of said gates, and each said base rod is received on the interior of a spring of said coiled spring.

3. A crab trap as set forth in claim 2, wherein one end of said spring engages with a wire of one gate of said gates and another end of said spring engages with a similar wire of said base, and each said spring forcedly pivots said gates fully outward when said cords are in slack condition.

4. A crab trap as set forth in claim 1, wherein said large ring is fixedly secured to a top portion of said base at its center and said pair of posts are spaced from each other and are fixedly secured at one end to said large ring and are diagonally disposed to said gates for free unrestricted passage of said cords, which are tied at one end to ends of said gates and are tied at another end to said rope.

5. A crab trap as set forth in claim 4, wherein said cords are freely received within the confines of said small ring which is fixedly secured to other ends of said posts and said small ring provides bearing means against said cords and said guide means for said cords.

* * * * *